United States Patent [19]
Kang

[11] Patent Number: 6,141,713
[45] Date of Patent: Oct. 31, 2000

[54] BUS ARBITRATOR WITH A HIERARCHICAL CONTROL STRUCTURE

[75] Inventor: Hoai Sig Kang, Kyoungki-do, Rep. of Korea

[73] Assignee: Hyundai Electronics Industries Co., Ltd., Ichon-shi, Rep. of Korea

[21] Appl. No.: 09/104,543

[22] Filed: Jun. 26, 1998

[30] Foreign Application Priority Data

Jun. 26, 1997 [KR] Rep. of Korea ...................... 97-27904

[51] Int. Cl.[7] .................................................. G06F 13/00
[52] U.S. Cl. .......................... 710/107; 710/110; 710/125; 710/126
[58] Field of Search ................................ 712/1; 710/107, 710/110, 111, 125, 126

[56] References Cited

U.S. PATENT DOCUMENTS

| | | | |
|---|---|---|---|
| 4,511,959 | 4/1985 | Nicolas et al. ........................... | 710/120 |
| 4,621,342 | 11/1986 | Capizzi et al. ........................... | 710/111 |
| 5,168,568 | 12/1992 | Thayer et al. ........................... | 710/125 |
| 5,301,298 | 4/1994 | Kagan et al. . | |
| 5,862,355 | 1/1999 | Logsdon ................................... | 395/296 |
| 5,884,051 | 3/1999 | Schaffer et al. ......................... | 710/107 |
| 5,987,549 | 11/1999 | Hagersten et al. ....................... | 710/107 |

*Primary Examiner*—Meng-Ai T. An
*Assistant Examiner*—Mackly Monestime
*Attorney, Agent, or Firm*—Jacobson, Price, Holman & Stern, PLLC

[57] ABSTRACT

A bus arbitration apparatus includes N number of hierarchical arbitrators, wherein each hierarchical arbitrator contained in the lowest hierarchy is connected to p number of the bus request units. Especially the hierarchical arbitrator of each hierarchy has: a selector for generating a selection signal based on bus requests from the hierarchical arbitrators of a lower hierarchy and priorities of the hierarchical arbitrators of the lower hierarchy, wherein the selection signal represents a selected hierarchical arbitrator of the lower hierarchy, and for generating the bus request from the selected hierarchical arbitrator as a bus request from said each hierarchy; and a multiplexer, in response to the selection signal, for providing bus cycle information from the selected hierarchical arbitrator as bus cycle information of said each hierarchy.

13 Claims, 6 Drawing Sheets

| A-REQUEST | B-REQUEST | PRIORITY-ENABLE | A-PRIORITY | B-PRIORITY | CURRENT | NEXT='0'=>A,'1'=>B |
|---|---|---|---|---|---|---|
| 1 | 0 | x | x | x | x | 0 |
| 0 | 1 | x | x | x | x | 1 |
| 1 | 1 | 0 | x | x | x | 0 |
| 1 | 1 | 1 | 1 | 0 | x | 0 |
| 1 | 1 | 1 | 0 | 1 | x | 1 |
| 1 | 1 | 1 | SAME | SAME | 0 | 1 |
| 1 | 1 | 1 | SAME | SAME | 1 | 0 | ns
BUS ARBITRATOR WITH A HIERARCHICAL CONTROL STRUCTURE

FIELD OF THE INVENTION

The present invention relates to a bus controller for used in a bus-based system; and, more particularly, to an improved bus arbitrator which can be implemented on a chip and is capable of effectively providing an improved bus arbitration capability with a hierarchical control structure.

DESCRIPTION OF THE PRIOR ART

A bus-based system, such as a microprocessor system, a micro-controller, a direct memory access controller(DMAC) and the like, is facilitated by a bus structure, otherwise referred as a shared bus system, to which various units, such as the microprocessors, system controllers and associated peripheral devices, can be connected and through which they can communicate with each other. The devices connected to the shared bus structure can transfer data from one of the devices to another one or more of the devices under the control of a bus arbitrator.

Figure 1:
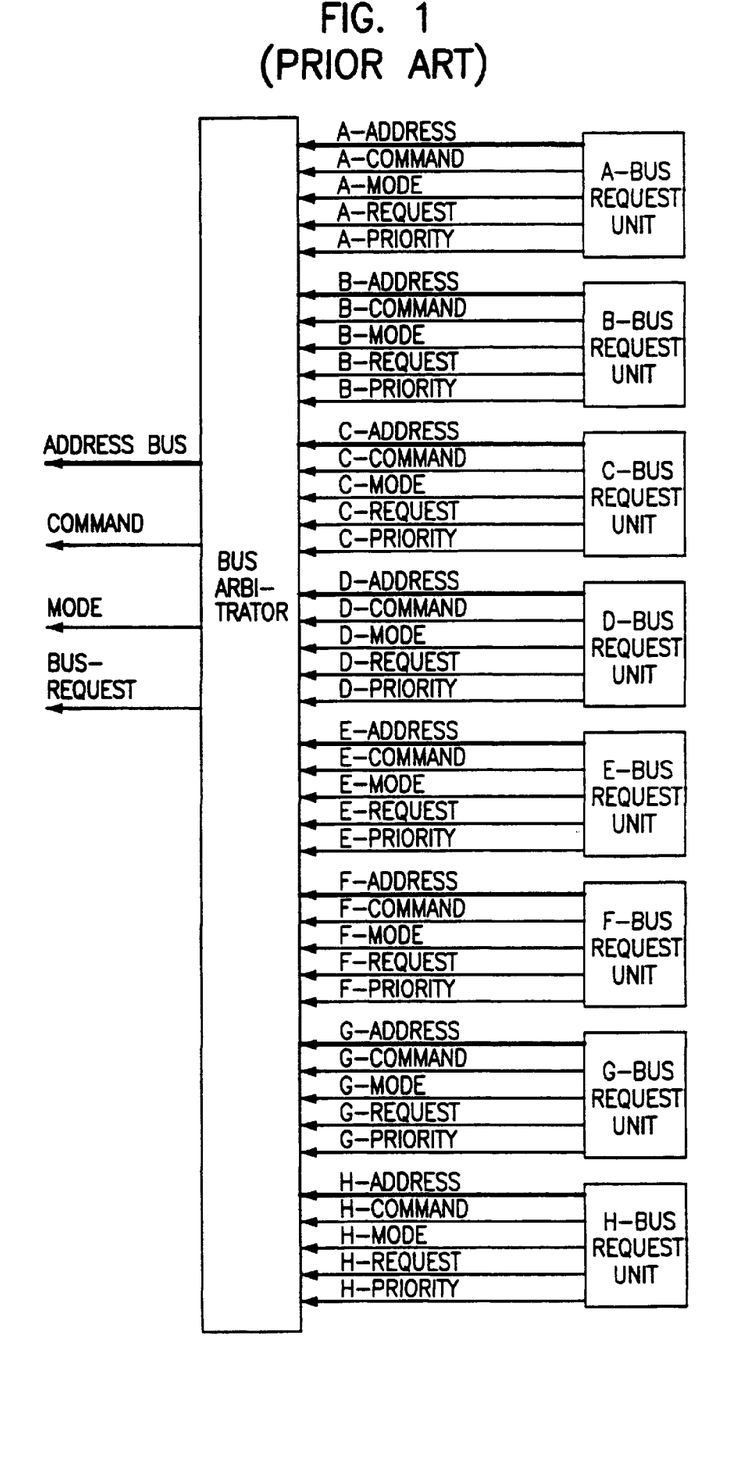
FIG. 1 shows a schematic block diagram of a conventional bus arbitration unit.

Referring to FIG. 1, there is shown an exemplary diagram of a conventional bus arbitrator to which all, e.g., 8, of the bus request units are connected. When bus-requests are issued from the bus request units, starting from a bus request unit having a higher priority, the bus control is sequentially allowed to the request units under the control of the conventional bus arbitrator. In this case, a priority of each bus request unit should be confirmed in the bus arbitrator in order to decide on which unit will gain the control of the bus. As a result, when the number of the units is increased, there is a problem that the bus arbitrator should have a bulky size, especially, in case of the implementation on a chip in order to simultaneously process a plurality of bus requests therefrom. Furthermore, when each of the bus request units has a different type bus cycle, there is another problem that the bus arbitrator has to perform a bus cycle type confirmation process as well as a priority confirmation process to thereby take a substantial amount of time for carrying out the bus arbitration.

SUMMARY OF THE INVENTION

It is, therefore, an object of the invention to provide a bus arbitrator with a hierarchical control structure, for use in a bus-based system, which can be implemented a chip in a size effective manner and is capable of effectively providing an effective bus arbitration operation.

In accordance with one aspect of the present invention, there is provided a bus arbitration apparatus for processing bus requests from M number of bus request units, wherein M is an integer more than 1, comprising: N number of hierarchical arbitrators, wherein each hierarchical arbitrator contained in the lowest hierarchy is connected to p number of the bus request units, wherein M and P are positive integers more than 1.

In accordance with a preferred embodiment of the present invention, the hierarchical arbitrator of each hierarchy includes: a selector for generating a selection signal based on bus requests from the hierarchical arbitrators of a lower hierarchy and priorities of the hierarchical arbitrators of the lower hierarchy, wherein the selection signal represents a selected hierarchical arbitrator of the lower hierarchy, and for generating the bus request from the selected hierarchical arbitrator as a bus request from said each hierarchy; and a multiplexer, in response to the selection signal, for providing bus cycle information form the selected hierarchical arbitrator as bus cycle information of said each hierarchy. Furthermore, the hierarchical arbitrator of the highest hierarchy further includes a priority register for storing a predetermined priority for each hierarchical arbitrator to generate the priority for said each hierarchical arbitrator.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 2:
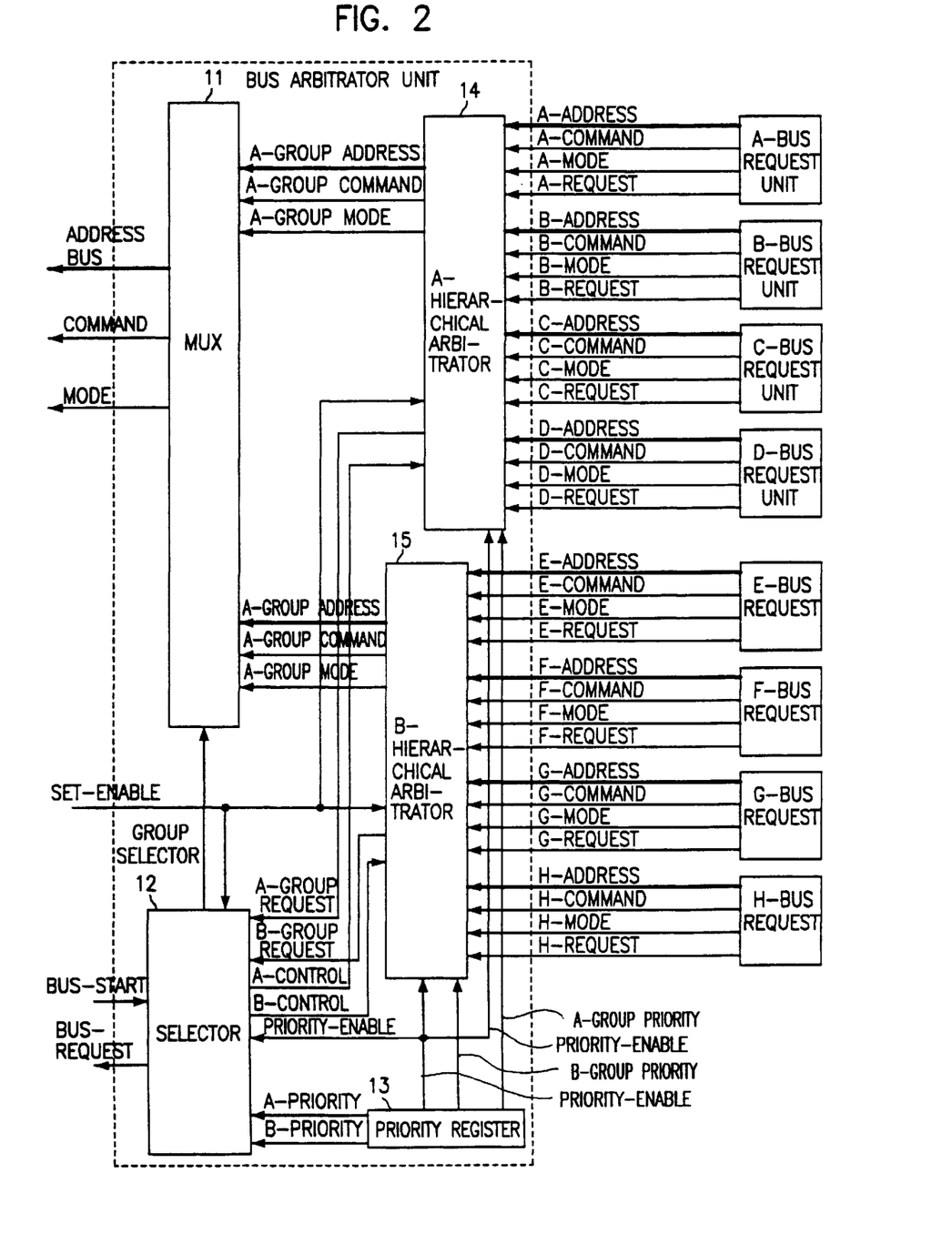
FIG. 2 discloses a block diagram of a bus arbitration unit in accordance with the present invention.

Referring to FIG. 2, there is shown a bus arbitration unit in accordance with the present invention. Although M number of units can be connected to the bus arbitration unit, for the sake of convenience, 8 number of the bus request units connected to the bus arbitration unit are shown in FIG. 2, wherein M is a positive integer more than 1. As shown, the bus arbitration unit is also operated as a highest level, e.g., T- level, hierarchical arbitrator which includes a selector 12, a multiplexer (MUX) 11, a priority register 13, and Q number, e.g., 2, of lower level, e.g., (M-1)-level, hierarchical arbitrators. 14 and 15, wherein Q is a positive integer more than 1.

The selector 12 receives bus request signals, e.g., A-and B-bus request signals, from the (M-1)-level hierarchical arbitrators, e.g., A- and B-hierarchical arbitrators 14 and 15 and a priority signal from the priority register 13. The selector 12 provides a bus request signal to the bus cycle state machine and then receives a bus start signal from a bus cycle state machine(not shown). In response to a bus start signal from the bus cycle state machine, the selector 12 generates a selection signal representing selected one of A- and B-hierarchical arbitrators. The selection signal is then coupled to the MUX 11. Simultaneously, the selector 12 provides A- and B-control signals as the bus start signal to the A- and B-hierarchical arbitrators, respectively, wherein a control signal of the selected hierarchical arbitrator has an enable state.

Each priority of the hierarchical arbitrators or each priority of the units can be designated in software by a system designer and stored in the priority register 13. On the other hand, the priority can be determined in a predetermined hardware sequence. In this case, there are some advantages, one of which is that when a priority enable signal of the priority registers is "0", the priority can be fixed in hardware as is further detailed hereinafter, referring to FIG. 6.

In accordance with the present invention, the bus start signal is also provided to the selector 12. That is, at a time of bus cycle, the bus start signals from the bus cycle state machine become a high state and, in the selector 12, is ANDed with a next signal representing the selection signal. As a result, the group selector 12 generates the A-control and the B-control signals wherein the A-control signal is fed to the A-hierarchical arbitrator 14 and the B-control signal is relayed to the B-hierarchical arbitrator 15. When the A-hierarchical arbitrator 14 is selected, the A-control signal becomes a high state identical to the state of the bus start signal.

The MUX 11 is responsive to the selection signal and serves to relay the selected bus cycle information, e.g., an address, a command, a bus cycle mode, from the selected hierarchical arbitrator to the bus cycle state machine.

As is described above, when the selector 12 issues the bus request signal, in response thereto, the bus state machine generates the bus start signal to thereby initiate a bus cycle without confirming the requested bus cycle mode. Thereafter, in response to the bus start signal, the M level hierarchical arbitrator provides the selected bus cycle information to the bus state machine in order to perform an exact bus cycle thereby. Therefore, the bus arbitration unit in accordance with the present invention can simultaneously perform with the bus cycle machine to thereby be implemented in a high performance bus controller or a high performance bus master.

The size of the priority register 13 is determined by the number of the bus request units connected to the bus arbitration unit. The priority register stores a priority enable bit and a plurality of priority bits. In accordance with the preferred embodiment, since two lower level hierarchical arbitrators are contained in the higher level hierarchical arbitrator, one priority bit denotes the priority of an assigned hierarchical arbitrator. It should be readily appreciated that, when more lower level arbitrators are connected to the higher level arbitrator, more priority bits are assigned to represent the priority of the corresponding hierarchical arbitrator. When the priority enable bit is set by "1", the above priority determination process is performed by using priority information, i.e., the priority bits, prestored in the priority register 13. When the priority enable bit is set by "0", the priority determination process is performed by a previously determined hardware priority. That is, when the priority enable signal is "1", the priority bits of the hierarchical arbitrators are employed in the priority determination process, wherein the priority bit of "1" is higher than the priority bit of "0". When both priority bits are identical to each other, the hierarchical arbitrators are sequentially selected in a predetermined sequence. On the other hand, when the priority enable bit is "0", a priority-disable bit is coupled to all of the arbitrators wherein when the priority disable bit is "1", the priority bits stored in the priority register 13 are not considered in the priority determination process.

Figure 3:
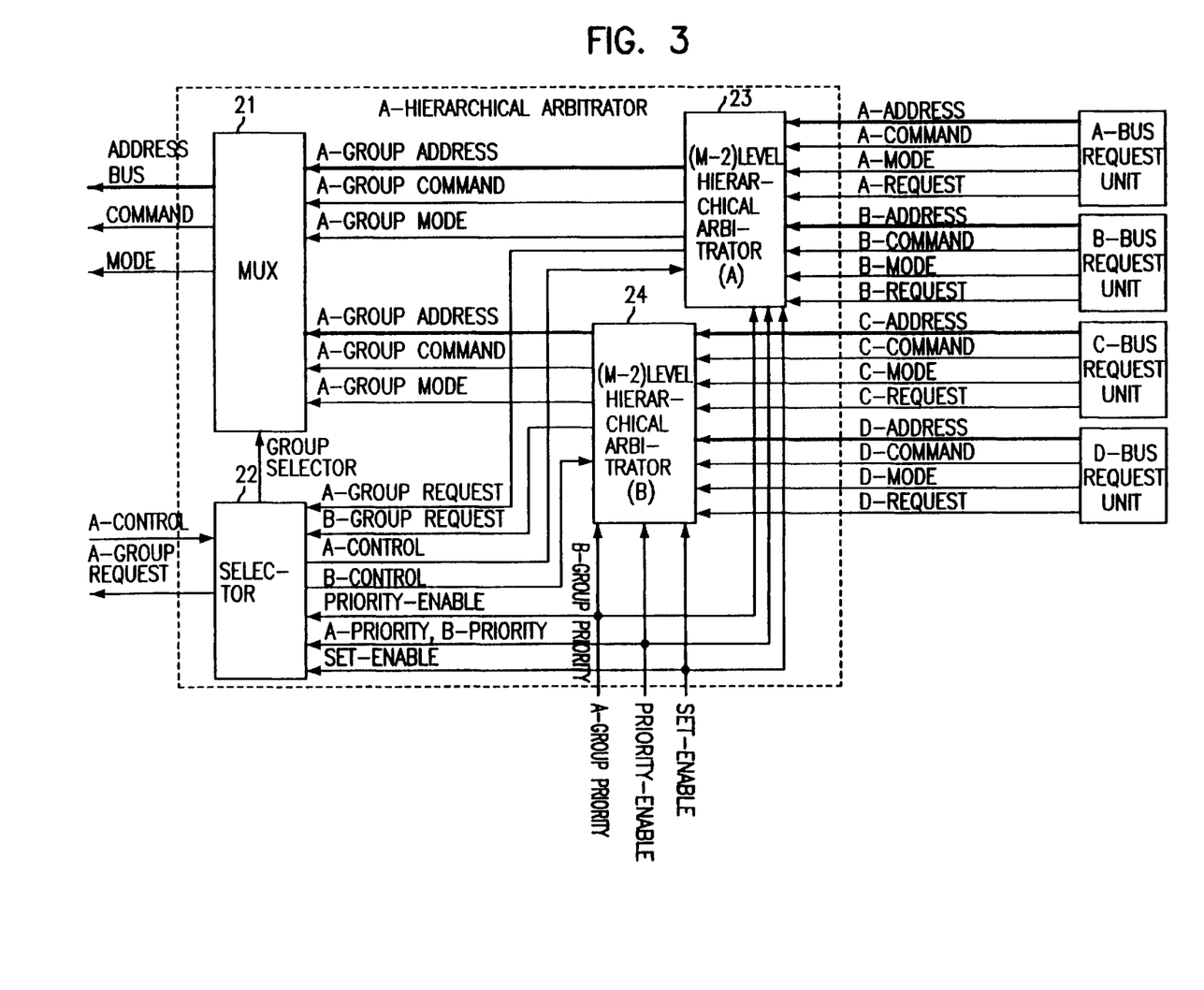
FIG. 3 describes a block diagram of a highest level hierarchical arbitrator shown in FIG. 2.

Referring to FIG. 3, there is shown the A-hierarchical arbitrator shown in FIG. 2. The A-hierarchical arbitrator 14 includes an MUX 21, a selector 22 and two (M-2)-level, e.g., lowest level, hierarchical arbitrators 23 and 24. The MUX 21 and the selector 22 are substantially identical to those of the M level arbitrator shown in FIG. 2. As shown, the (M-2) level arbitrators represent the lowest level hierarchy since the number of the bus register units is illustrated as 8 and two bus request units are connected to each of the (M-2)-level hierarchical arbitrators 23 and 24.

Figure 4:
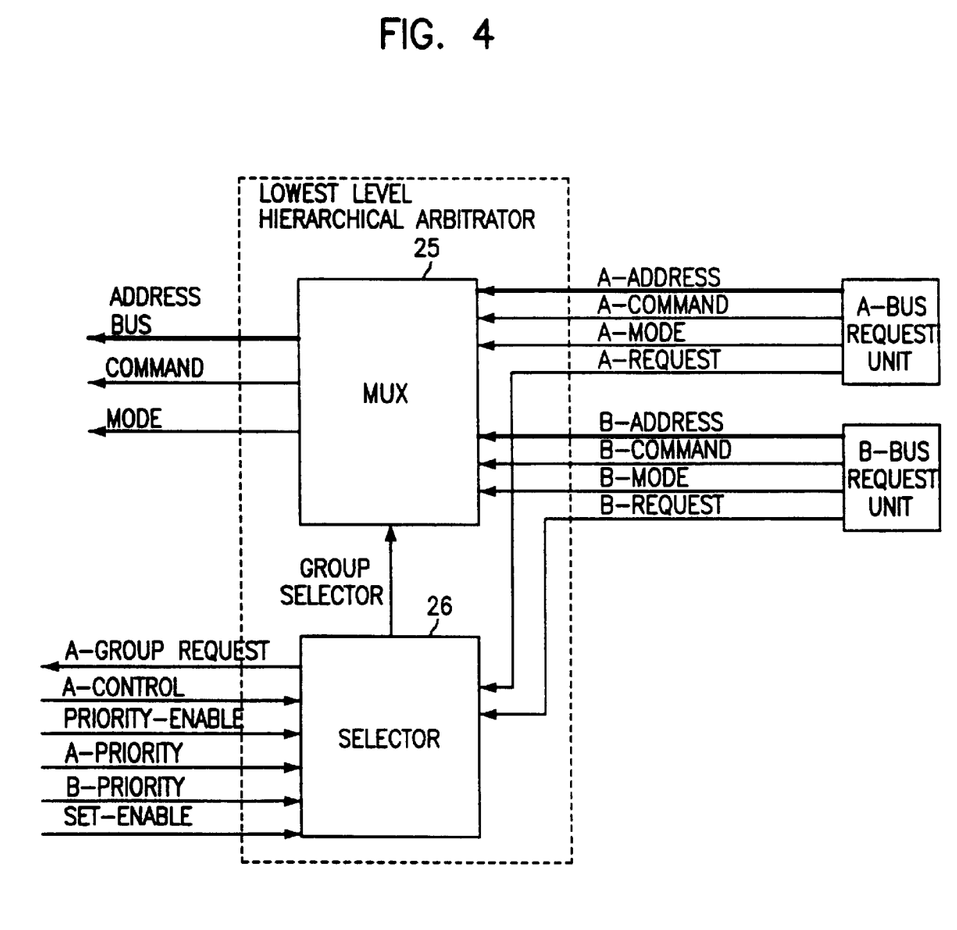
FIG. 4 illustrates a block diagram of a lowest level hierarchical arbitrator in accordance with the present invention and shown in FIG. 3.

Referring to FIG. 4, there is a detailed diagram of an A-lowest level hierarchical arbitrator 23. The hierarchical arbitrator 23 contains an MUX 25 and a selector 26 which are substantially identical to those of the M level arbitrator shown in FIG. 2. Two bus request units are connected to the MUX 25 and the bus request signals from two units are fed to the selector 26.

Figure 5:
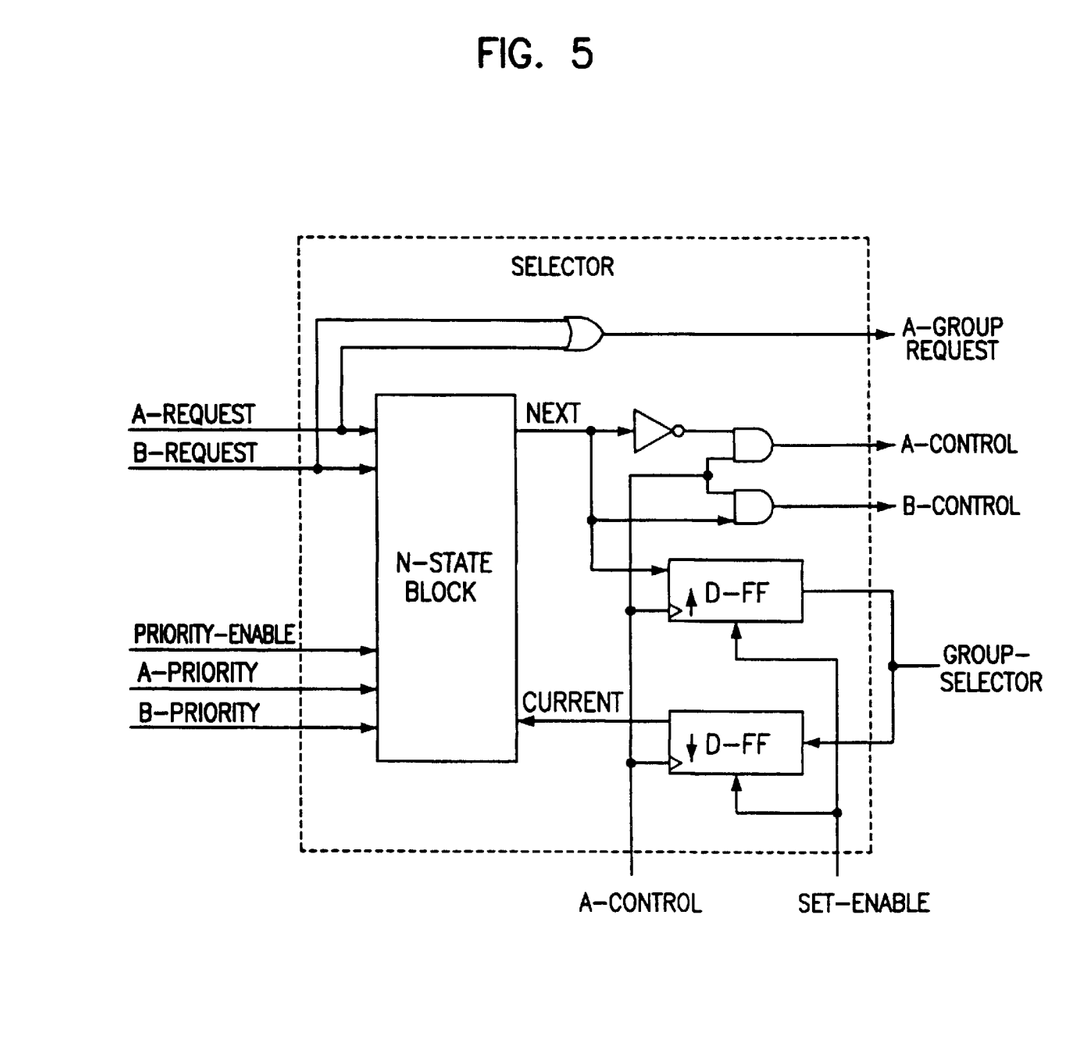
FIG. 5 provides a detailed diagram of a selector shown in FIG. 4.

Referring to FIG. 5, there is depicted a selector which is commonly employed in each level hierarchical arbitrator. The selector includes a N-state block, an OR gate, a control signal generation block and a current signal generation block.

Assuming that the selector is the selector 22 shown in FIG. 3, the N-state block receives the A- and B-bus request signals, a priority enable bit, A- and B-priority bits and a current signal to generate a next signal representing a selected lower level hierarchical arbitrator, i.e., A-hierarchical arbitrator, at next cycle. The A- and B-bus request signals are ORed at the OR gate which generates a bus request signal which is then coupled to the selector 12 of the highest level hierarchical arbitrator. The control signal generation block has an inverter and two AND gates; and receives the next signal and A-control signal from the selector 12 of the highest level hierarchical arbitrator to generate A- and B-next level control signal, wherein, for example, A-next level control signal is then coupled to the selector 26 of the lowest level hierarchical arbitrator. The current signal generation block is provided with two D-flip flops; and receives the next signal and the A-control signal to generate the current signal at a falling edge of the A-control signal and to generate the next signal as the selection signal at rising edge of the A-control signal.

The A-control signal is ANDed with the inverted next signal and the next signal and the A-next control signal and the A-next control signal are generated, respectively. That is, when the next signal is "0" and the lowest level A-hierarchical arbitrator 23 is selected, at rising edge of the A-control signal, the selection signal is "0" so that the bus cycle information from the lowest level A-hierarchical arbitrator is provided through the MUX 21. During the high state of the A-control signal, the A-next control signal becomes a high state so that the A-next control signal is provided as the bus start signal to the selected lower level arbitrator. On the other hand, during the high state of the A-control signal, the B-control signal becomes a low state to thereby maintain a current state of the lowest level B-hierarchical arbitrator. On the other hand, the set enable signal is used in the reset operation of the selector 12.

Assuming that the selector is contained in the A-lowest hierarchical arbitrator 23, the A- and B-bus request signals from the A- and B-bus request units are relayed to the selector 26 and the A- and B-priority signal from the highest level selector 12 is fed to the selector 26. At the selector 26, the next signal is generated based on the A- and the B-bus request signals and the A- and the B-priority signals. The next signal is then coupled as a selection signal to the MUX 25 at the rising edge of the A-control signal to thereby relay the bus cycle information from the selected A-bus request unit via the MUX 25 to the upper level hierarchical arbitrator 14. This process is continued until the bus cycle information is fed to the bus state machine in which the type of bus cycle is tested based on the bus cycle mode contained in the lastly selected bus cycle information. On the other hand, since there are shown two bus request units, when the selection signal is "1", the A-bus request unit is selected by the MUX 25 and the selection signal is "0", the second unit is selected. The current signal is generated at the falling edge of the A-control signal based on the next signal and is used in generating the another next signal from the selector 26.

Figure 6:
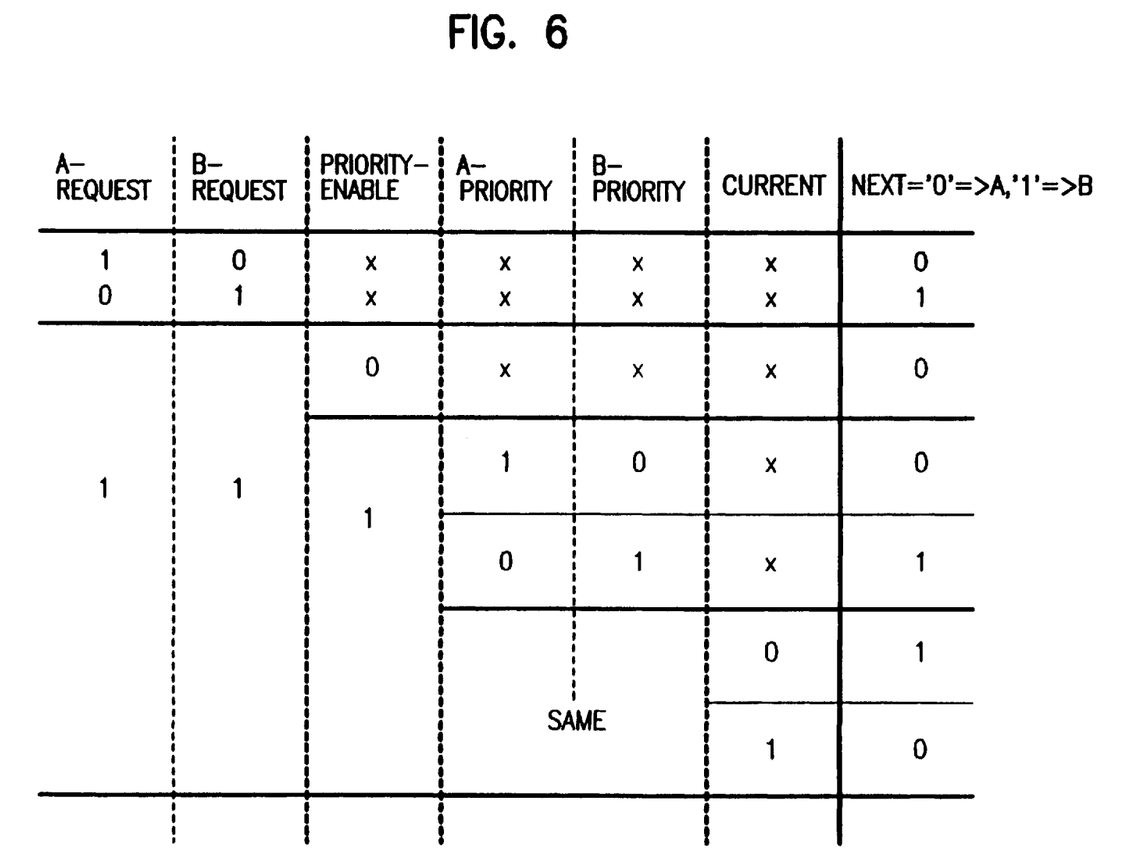
FIG. 6. depicts a block diagram of a state table for used in the selection operation in accordance with the present invention.

Referring now to the FIG. 6, there is shown a truth table.

As shown, when one of the hierarchical arbitrators or the bus request units issues a bus request signal, the issued hierarchical arbitrator is selected. When the bus request signal from both of the hierarchical arbitrators contained in the same level are issued (11) and the priority enable signal is 1, based on the priority bits thereof, the hierarchical arbitrator or the bus request unit having a higher priority is selected. When the priorities of two hierarchical arbitrators or the bus request units are identical to each other, two units are sequentially selected. In this case, since the set enable signal become "1", the current signal become 1. On the other hand, when the priority enable signal is "0", the hardware priority decision process is performed. That is, first, the bus request unit issuing the bus request signal is selected. When all of the bus request units issue the bus request signals, the bus request units are sequentially selected according to the predetermined sequence.

As can be seen from the above, the bus arbitrator in accordance with the present invention has a hierarchical structure to thereby effectively provide an effective bus arbitration in a bus-based system without having a bulky chip size.

While the present invention has been shown and described with reference to the particular embodiments, it will be apparent to those skilled in the art that many changes and modifications may be made without departing from the spirit and scope of the invention as defined in the appended claims.

What is claimed is:

1. A bus arbitration apparatus for processing bus requests from M number of bus request units, said bus arbitration apparatus also operating as a highest level hierarchical arbitrator, comprising:

Q number of lower level hierarchical arbitrators, each of said lower level hierarchical arbitrators being connected to P number of bus request units, wherein M, Q and P are positive integers greater than 1, each hierarchical arbitrator including, a selector for generating a selection signal based on bus requests from said lower level hierarchical arbitrators and priorities of the lower level hierarchical arbitrators, wherein the selection signal represents a selected lower level hierarchical arbitrator, said selector for generating a bus request from the selected lower level hierarchical arbitrator; and a multiplexer, in response to the selection signal for providing bus cycle information from the selected hierarchical arbitrator;

wherein said selector includes, a N-state block, receiving the bus requests, the priorities and a current signal, for generating a next signal representing a selected lower level hierarchical arbitrator, at a next cycle;

an OR gate for ORing the bus requests to generate the bus request generated by the selector which is coupled to a higher level hierarchical arbitrator;

a control signal generation block, receiving the next signal and a previous control signal from the higher level hierarchical arbitrator, for generating next control signals; and a current signal generation block, receiving the next signal and the previous control signal, for generating the current signal at a falling edge of the previous control signal and for generating the next signal as the selection at a rising edge of the previous control signal.

2. The bus arbitration unit as recited in claim 1, wherein the highest level hierarchical arbitrator further includes a priority register for storing a predetermined priority for each lower level hierarchical arbitrator.

3. The bus arbitration apparatus as recited in claim 1, wherein M is an even number and P and Q are of 2.

4. The bus arbitration apparatus as recited in claim 1, wherein the bus cycle information includes an address, a command and a cycle mode.

5. The bus arbitration apparatus as recited in claim 1, wherein the control signal generation block includes an inverter and two AND gate.

6. The bus arbitration apparatus as recited in claim 5, wherein the current signal generation block includes two D-flip flops.

7. The bus arbitration apparatus as recited in claim 6, wherein the bus arbitration apparatus is implemented on a chip and the previous control signal is a bus control start signal.

8. A bus-based system having a bus arbitration unit and a bus cycle machine, the bus arbitration unit providing bus cycle information from a selected bus request to the bus cycle machine based on bus requests from M number of bus request units, said bus arbitration unit also operating as a highest level hierarchical arbitrator, comprising:

Q number of lower level hierarchical arbitrators, each of said lower level hierarchical arbitrators being connected to P number of bus request units, wherein M, Q and P are positive integers greater than 1, each hierarchical arbitrator including, a selector for generating a selection signal based on bus requests from said lower level hierarchical arbitrators and priorities of the lower level hierarchical arbitrators, wherein the selection signal represents a selected lower level hierarchical arbitrator, said selector for generating a bus request from the selected lower level hierarchical arbitrator; and a multiplexer, in response to the selection signal, for providing bus cycle information from the selected hierarchical arbitrator;

wherein said selector includes, a N-state block, receiving the bus requests, the priorities and a current signal, for generating a next signal representing a selected lower level hierarchical arbitrator, at a next cycle;

an OR gate for ORing the bus requests to generate the bus request generated by the selector which is coupled to a higher level hierarchical arbitrator;

a control signal generation block, receiving the next signal and a previous control signal from the higher level hierarchical arbitrator, for generating next control signals; and a current signal generation block, receiving the next signal and the previous control signal, for generating the current signal at a falling edge of the previous control signal and for generating the next signal as the selection at a rising edge of the previous control signal.

9. The bus-based system as recited in claim 8, wherein the control signal generation block includes an inverter and two AND gate.

10. The bus-based system as recited in claim 9, wherein the current signal generation block includes two D-flip flops.

11. The bus-based system as recited in claim 10, wherein the bus arbitration apparatus is implemented on a chip and the previous control signal is a bus control start signal.

12. The bus-based system as recited in claim 8, wherein the highest level hierarchical arbitrator further includes a priority register for storing a predetermined priority for each lower level hierarchical arbitrator.

13. A bus arbitration apparatus for processing bus requests from a plurality of bus request units, said bus arbitration apparatus also operating as a highest level hierarchical arbitrator, comprising:

a plurality of lower level hierarchical arbitrators, each of said plurality of lower level hierarchical arbitrators being connected to at least two bus request units, the highest level hierarchical arbitrator and each of said plurality of lower level hierarchical arbitrators including, a selector for generating, using a N-state block receiving bus requests from said lower level hierarchical arbitrators and stored priorities of said lower level hierarchical arbitrators, a selection signal representing a selected lower level hierarchical arbitrator, said selector including an OR gate for ORing the bus requests from the lower level hierarchical arbitrators to generate a bus request which is coupled to a higher level hierarchical arbitrator; and a multiplexer for providing, in response to the selection signal, bus cycle information from the selected hierarchical arbitrator.

* * * * *